Dec. 5, 1933.  T. W. McCREARY  1,938,540
REENFORCED GLASSWARE
Filed Nov. 4, 1932

INVENTOR
Thomas W. McCreary,
By Archworth Martin,
Attorney.

Patented Dec. 5, 1933

1,938,540

UNITED STATES PATENT OFFICE 1,938,540

REENFORCED GLASSWARE

Thomas W. McCreary, Monaca, Pa.

Application November 4, 1932. Serial No. 641,236

4 Claims. (Cl. 49—86)

My invention relates to reenforced glassware and the method of making the same, and more particularly to that type of glassware containing metallic strands or wire mesh.

One object of my invention is to provide a means and a method whereby the reenforcing elements may be more readily incorporated in the glassware than by various methods heretofore employed.

Another object of my invention is to provide an improved manner of completely imbedding the reenforcing element in the ware, without the protrusion of any metallic reenforcement at the surface of the ware.

Figure 1:
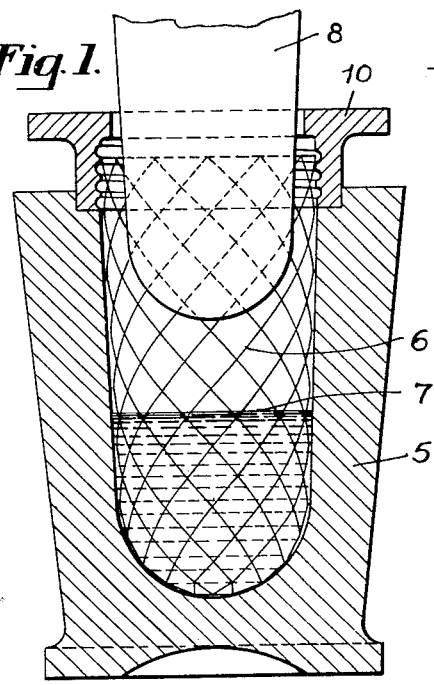
Figure 2:
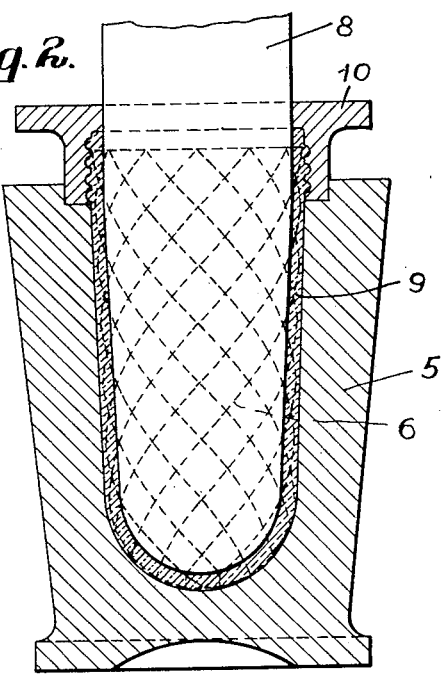
Figure 3:
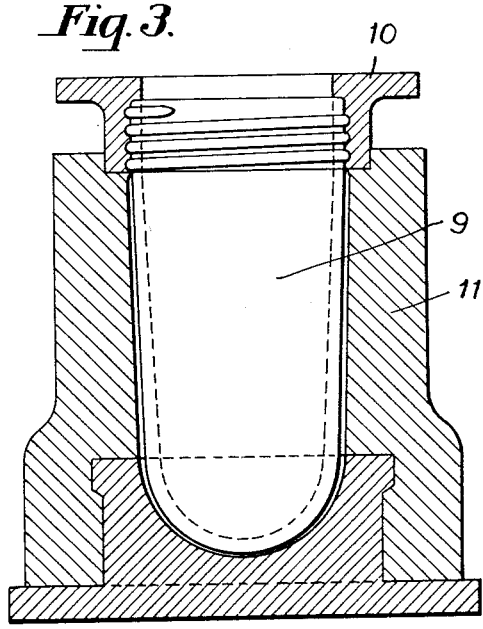
Figure 4:
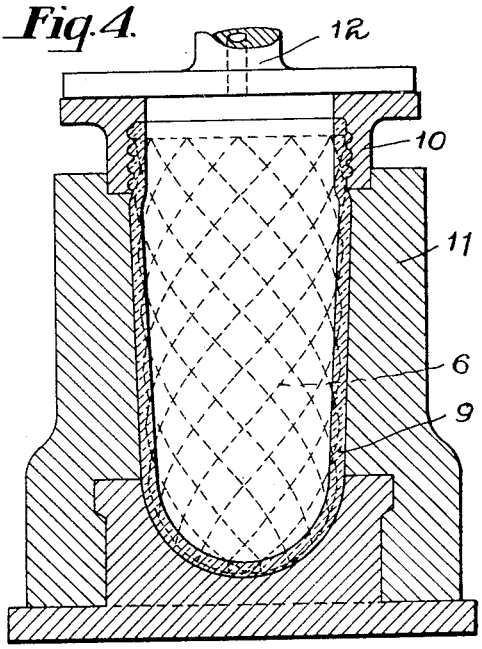

One manner in which my invention may be practised is diagrammatically illustrated in the accompanying drawing, wherein Figure 1 is a sectional view through a parison or blank mold at a preliminary stage in the operation of shaping a charge of glass therein; Fig. 2 is a similar view showing the condition of the first shaping operation; Fig. 3 is a sectional view through a blow mold, preliminary to expansion of the blank to its final form, and Fig. 4 is a similar view showing the completely-formed article.

Broadly speaking, my invention consists in placing a mesh-like body in a mold, expanding a charge of glass to partially imbed the mesh, and thereafter transferring the blank with its contained mesh to a finishing mold of slightly larger diameter than the blank mold, and further expanding the glass to completely enclose the mesh.

The numeral 5 indicates a blank mold which may be of any suitable form. A metallic mesh 6 of basket-like form and having the general contour and dimensions of the mold cavity is placed within the mold. Thereupon a charge of molten glass 7 is introduced into the mold, and a plunger 8 then inserted to expand the glass and spread it into contact with the walls of the mold. Since the wire will, at many points, have engagement with and be supported by the walls of the mold, it will not be completely imbedded during the blank-forming operation.

It is important, both from the standpoint of appearance and from practical considerations, that the wire be completely imbedded in the glass. If the wire protrudes from the surface of the glass article, it will not only detract from the appearance thereof, but will render handling of the article inconvenient. Again, the metal will deteriorate through corrosion, and of course, will not so fully strengthen the glass as if it were completely imbedded therein.

The partially-formed article or blank is represented by the numeral 9. At the completion of the shaping operation in the blank mold, the plunger 8 is withdrawn and the neck mold 10 is raised and brought into position over a blow mold or finishing mold 11. Thereupon a blow head 12 is placed on the neck mold, and the article is expanded to its completed form. The cavity of the mold 11 is slightly larger than the cavity of the mold 5, so that there will be further expansion of the glass to cause it to completely surround the mesh. It will be understood that the final operation may be performed in a press mold, if desired, instead of in a blow mold.

The difference in internal dimensions as between the blank mold and the blow mold is preferably such that the degree of permissible expansion of the glass in the blow mold will result in the mesh being located approximately midway between the internal and external surfaces of the article.

Location of the mesh entirely within the mass of the glass article has the further advantage that the glass is reinforced somewhat centrally between its faces, so that splinters and pieces of glass are not so likely to break off through expansion and contraction, or through mechanical impacts.

I claim as my invention:—

1. The method which comprises placing wire mesh within a mold, expanding a charge of glass within the mold cavity to form a blank which partially imbeds the mesh, transferring the blank to a mold having a larger cavity and there effecting further expansion of the blank to more completely imbed the mesh.

2. The method which comprises placing a wire mesh in a blank mold, the mesh being of substantially the same dimensions as the mold cavity, expanding a charge of glass within the mold to form a blank which partially imbeds the mesh, transferring the blank to a mold having a larger cavity, and there effecting further expansion of the blank to more completely imbed the mesh.

3. The method which comprises placing wire mesh in a mold, compressing a charge of glass within the mold to form a blank that partially imbeds the wire, transferring the blank to a blow mold, and therein effecting further expansion of the blank by a blowing operation.

4. The method of forming hollow glassware, which comprises bringing molten glass into engagement with a wire skeleton having approximately the contour of the article to be formed, causing said glass to partially imbed the wire, and thereafter further shaping the glass to effect more complete imbedment of the wire.

THOMAS W. McCREARY.